United States Patent
Dressler et al.

(10) Patent No.: US 7,725,111 B2
(45) Date of Patent: May 25, 2010

(54) LOCATION DETERMINATION USING RF FINGERPRINTING

(75) Inventors: Robert M. Dressler, Los Altos Hills, CA (US); David S. Spain, Portola Valley, CA (US)

(73) Assignee: Polaris Wireless, Inc., Santa Clara, CA (US)

( * ) Notice: Subject to any disclaimer, the term of this patent is extended or adjusted under 35 U.S.C. 154(b) by 0 days.

(21) Appl. No.: 10/924,040

(22) Filed: Aug. 23, 2004

(65) Prior Publication Data

US 2005/0037776 A1     Feb. 17, 2005

Related U.S. Application Data

(63) Continuation of application No. 10/128,128, filed on Apr. 22, 2002, now Pat. No. 6,782,265, which is a continuation of application No. 09/532,418, filed on Mar. 22, 2000, now Pat. No. 6,393,294, which is a continuation-in-part of application No. 09/158,296, filed on Sep. 22, 1998, now Pat. No. 6,269,246.

(51) Int. Cl.
*H04M 1/00* (2006.01)

(52) U.S. Cl. .............. 455/456.1; 455/414.2; 455/456.3; 455/456.2; 455/457

(58) Field of Classification Search ............. 455/456.1, 455/456.2, 410, 63.1, 414.2, 456.3, 457, 455/458; 342/453, 452, 382, 325.16
See application file for complete search history.

(56) References Cited

U.S. PATENT DOCUMENTS

| | | | |
|---|---|---|---|
| 4,907,290 A | | 3/1990 | Crompton |
| 5,055,851 A | * | 10/1991 | Sheffer ........................ 342/457 |
| 5,230,081 A | | 7/1993 | Yamada et al. |
| 5,293,642 A | | 3/1994 | Lo |
| 5,293,645 A | | 3/1994 | Sood |
| 5,327,144 A | | 7/1994 | Stilp et al. |

(Continued)

FOREIGN PATENT DOCUMENTS

EP          0982964 A2      8/1998

(Continued)

OTHER PUBLICATIONS

I. Gaspard et al., "Position Assignment in Digital Cellular Mobile Radio Networks (e.g., GSM) Derived from Measurements at the Protocol Interface," IEEE 1997, pp. 592-596.

(Continued)

*Primary Examiner*—David Q Nguyen
(74) *Attorney, Agent, or Firm*—DeMont & Breyer, LLC

(57) ABSTRACT

A method for determining the location of a mobile unit (MU) in a wireless communication system and presenting it to a remote party. The location of a remote MU is determined by comparing a snapshot of a predefined portion of the radio-frequency (RF) spectrum taken by the MU to a reference database containing multiple snapshots taken at various locations. The result of the comparison is used to determine if the MU is at a specific location. The comparison may be made in the MU, or at some other location situated remotely from the MU. In the latter case, sufficient information regarding the captured fingerprint is transmitted from the MU to the remote location. The database may be pre-compiled or generated on-line.

7 Claims, 10 Drawing Sheets

U.S. PATENT DOCUMENTS

| | | | |
|---|---|---|---|
| 5,355,526 A | 10/1994 | Berninger | |
| 5,390,234 A | 2/1995 | Bar-Noy et al. | |
| 5,404,376 A | 4/1995 | Dent | |
| 5,423,067 A | 6/1995 | Manabe | |
| 5,442,684 A | 8/1995 | Hashimoto et al. | |
| 5,461,365 A | 10/1995 | Schlager et al. | |
| 5,481,588 A | 1/1996 | Rickli et al. | |
| 5,490,288 A | 2/1996 | Wiatrowski | |
| 5,493,286 A | 2/1996 | Grube et al. | |
| 5,508,707 A | 4/1996 | LeBlanc et al. | |
| 5,513,243 A | 4/1996 | Kage | |
| 5,524,136 A | 6/1996 | Bar-Noy et al. | |
| 5,539,924 A | 7/1996 | Grube et al. | |
| 5,548,816 A | 8/1996 | DeVaney | |
| 5,552,795 A * | 9/1996 | Tayloe et al. | 342/357.16 |
| 5,561,839 A | 10/1996 | Osterberg et al. | |
| 5,564,079 A | 10/1996 | Olsson | |
| 5,570,412 A | 10/1996 | LeBlanc | |
| 5,592,180 A | 1/1997 | Yokev et al. | |
| 5,596,330 A | 1/1997 | Yokev et al. | |
| 5,600,706 A | 2/1997 | Dunn et al. | |
| 5,602,903 A * | 2/1997 | LeBlanc et al. | 455/456.2 |
| 5,650,770 A | 7/1997 | Schlager et al. | |
| 5,657,487 A | 8/1997 | Doner | |
| 5,666,662 A | 9/1997 | Shibuya | |
| 5,675,344 A | 10/1997 | Tong et al. | |
| 5,717,406 A | 2/1998 | Sanderford et al. | |
| 5,724,660 A * | 3/1998 | Kauser et al. | 455/456.2 |
| 5,732,354 A | 3/1998 | MacDonald | |
| 5,736,964 A | 4/1998 | Ghosh et al. | |
| 5,758,288 A | 5/1998 | Dunn et al. | |
| 5,787,354 A | 7/1998 | Gray et al. | |
| 5,802,473 A | 9/1998 | Rutledge et al. | |
| 5,926,765 A | 7/1999 | Sasaki | |
| 5,974,330 A | 10/1999 | Negishi | |
| 5,987,306 A | 11/1999 | Nilsen et al. | |
| 6,006,089 A | 12/1999 | Sasaki et al. | |
| 6,026,304 A | 2/2000 | Hilsenrath et al. | |
| 6,064,339 A | 5/2000 | Wax et al. | |
| 6,108,557 A | 8/2000 | Wax et al. | |
| 6,134,448 A | 10/2000 | Shoji et al. | |
| 6,236,365 B1 | 5/2001 | LeBlanc et al. | |
| 6,236,849 B1 | 5/2001 | Reudink et al. | |
| 6,249,252 B1 | 6/2001 | Dupray | |
| 6,263,208 B1 | 7/2001 | Chang et al. | |
| 6,275,190 B1 | 8/2001 | Sugiura et al. | |
| 6,308,071 B1 | 10/2001 | Kalev | |
| 6,362,783 B1 | 3/2002 | Sugiura et al. | |
| 6,393,294 B1 | 5/2002 | Perez-Breva et al. | |
| 6,496,701 B1 | 12/2002 | Chen et al. | |
| 6,564,065 B1 | 5/2003 | Chang et al. | |
| 6,674,403 B2 | 1/2004 | Gray et al. | |
| 6,704,651 B2 | 3/2004 | van Diggelen et al | |
| 6,748,224 B1 * | 6/2004 | Chen et al. | 455/456.1 |
| 6,782,262 B1 | 8/2004 | Lundborg | |
| 6,799,046 B1 | 9/2004 | Tang | |
| 6,799,047 B1 | 9/2004 | Bahl et al. | |
| 6,873,852 B2 | 3/2005 | Koorapaty et al. | |
| 6,952,181 B2 | 10/2005 | Karr et al. | |
| 2003/0043073 A1 | 3/2003 | Gray | |
| 2003/0214397 A1 | 11/2003 | Perkins et al. | |
| 2005/0040968 A1 | 2/2005 | Damarla et al. | |
| 2005/0270236 A1 | 12/2005 | Krumm et al. | |
| 2006/0240839 A1 | 10/2006 | Chen et al. | |
| 2006/0240842 A1 | 10/2006 | Spain, Jr. et al. | |

FOREIGN PATENT DOCUMENTS

| | | |
|---|---|---|
| EP | 0930514 A2 | 7/1999 |
| EP | 0967816 | 12/1999 |
| EP | 0982964 A2 | 1/2000 |
| EP | 0982964 A3 | 1/2000 |
| EP | 1018457 A1 | 7/2000 |
| GB | 2329801 A | 3/1999 |
| JP | 2-44929 A | 2/1990 |
| JP | 11178039 A | 7/1999 |
| JP | 11178066 | 7/1999 |
| JP | 11205845 A | 7/1999 |
| WO | 9728456 | 8/1997 |
| WO | 09733386 A1 | 9/1997 |
| WO | 9810538 | 3/1998 |
| WO | 9815149 | 4/1998 |
| WO | 9841048 | 9/1998 |
| WO | 9908909 | 2/1999 |
| WO | 0002408 A1 | 1/2000 |
| WO | 0050918 | 8/2000 |
| WO | 2004/008795 A | 1/2004 |
| WO | 2006031034 A1 | 3/2006 |
| WO | 2006031035 A1 | 3/2006 |

OTHER PUBLICATIONS

M. Hellebrandt et al. "Estimating Position and Velocity of Mobiles in a Cellular Radio Network," IEEE Trans. Vehicular Tech. 1997, pp. 65-71.

J. Jimenez et al., "Mobile Location Using Coverage Information: Theoretical Analysis and Results," Euro-Cost, Apr. 1999, pp. 1-9.

H. Koshima et al., "Personal Locator Services Emerge," IEEE Spectrum, 2000, pp. 41-48.

L. Cong et al., "Hybrid TDOA/AOA Mobile User Location for Wideband CDNA Cellular Systems," IEEE Trans. Wireless Comm, 2000, pp. 439-447.

Dr. Heiko Schmitz, Et Al., A New Method for Positioning of Mobile Users by Comparing a Time Series of Measured Reception Power Levels with Predictions, IEEE, 0-7803-7757-5/03, pp. 1993-1997, 2003.

Sarwar, Babar, "U.S. Appl. No. 11/419,654 Office Action", Dec. 30, 2008, Publisher: USPTO, Published in: US.

Banks, Harold M., "U.S. Appl. No. 09/532,418 Office Action Oct. 23, 2001", . Publisher: USPTO, Published in: US.

Isopescu, Ciprian, "EP Application No. 01924271.8 Office Action", Oct. 17, 2008, Publisher: EPO, Published in: EP.

Isopescu, Ciprian, "EP Application No. 01924271.8 Office Action", May 16, 2007, Publisher: EPO, Published in: EP.

Isopescu, C, "EP Application No. 01924271.8 Office Action", Jun. 24, 2003, Publisher: EPO, Published in: EP.

Isopescu, C, "EP Application No. 01924271.8 Office Action", Jul. 14, 2004, Publisher: EPO, Published in: EP.

Isopescu, C, "EP Application No. 01924271.8 Office Action", Aug. 9, 2005, Publisher: EPO, Published in: EP.

Moore, James K., "U.S. Appl. No. 10/128,128 Notice of Allowance Jun. 14, 2004", , Publisher: USPTO, Published in: US.

Moore, James K., "U.S. Appl. No. 10/128,128 Office Action", Feb. 27, 2003, Publisher: USPTO, Published in: US.

Moore, James K., " U.S. Appl. No. 10/128,128 Office Action", Apr. 5, 2004, Publisher: USPTO, Published in: US.

Ewart, James D., "U.S. Appl. No. 10/910,511 Office Action", Feb. 23, 2006, Publisher: SPTO, Published in: US.

Ewart, James D., "U.S. Appl. No. 10/910,511 Office Action", Jun. 6, 2006, Publisher: USPTO, Published in: US.

Ewart, James D., "U.S. Appl. No. 10/910,511 Notice of Allowance Jul. 5, 2006", , Publisher: USPTO, Published in: US.

Niemeijer, Reint, "PCT Application No. PCT/US2007/062009 International Preliminary Report on Patentability Dec. 11, 2008", , Publisher: PCT, Published in: PCT.

Niemeijer, Reint, "PCT Application No. PCT/US2007/062009 Search Report and Written Opinion Jul. 4, 2007", , Publisher: PCT, Published in: PCT.

Ewart, James D., "U.S. Appl. No. 11/419,645 Notice of Allowance Jun. 19, 2007", , Publisher: USPTO, Published in: US.

Ewart, James D., "U.S. Appl. No. 11/419,645 Office Action", May 16, 2007, Publisher: USPTO, Published in: US.

Banks, Harold M., "U.S. Appl. No. 09/158,296 Notice of Allowance Feb. 9, 2001", , Publisher: USPTO, Published in: US.

Banks, Harold M, "U.S. Appl. No. 09/158,296 Office Action Dec. 10, 1999", , Publisher: USPTO, Published in: US.

Banks, Harold M, "U.S. Appl. No. 09/158,296 Office Action Jun. 30, 2000", , Publisher: USPTO, Published in: US.

Banks, Harold, "U.S. Appl. No. 09/532,418 Notice of Allowance Dec. 18, 2001", , Publisher: USPTO, Published in: US.

Banks, Harold, "U.S. Appl. No. 09/532,418 Office Action Feb. 12, 2001", , Publisher: USPTO, Published in: US.

Banks-Harold, Marsha D., "PCT Application No. PCT/US01/09253 International Search Report Jul. 13, 2001", , Publisher: PCT, Published in: PCT.

Moore, James K., "PCT Application No. PCT/US01/09253 Written Opinion Feb. 14, 2002",, Publisher: PCT, Published in: PCT.

* cited by examiner

| Fingerprint Structure | | | | | | |
|---|---|---|---|---|---|---|
| 400 | | | | | | |
| 401 | Time of Capture: | | | | | |
| 403 | Station ID: | I1 | I2 | I3 | ... | In |
| 405 | Frequency: | F1 | F2 | F3 | ... | Fn |
| 407 | Tuning Parameters: | P1 | P2 | P3 | ... | Pn |
| 409 | Transmitter Location: | L1 | L2 | L3 | ... | Ln |
| 411 | Signal Strength 1: | S11 | S12 | S13 | ... | S1n |
| 413 | Signal Strength 2: | S21 | S22 | S23 | ... | S2n |
| 415 | ... | ... | ... | ... | ... | ... |
| 417 | Signal Strength m: | Sm1 | Sm2 | Sm3 | ... | Smn |

Fig. 9

| No. | Lat. | Long. | Time | Fingerprint | Description |
|---|---|---|---|---|---|
| 1 | | | | | |
| 2 | | | | | |
| 3 | | | | | |
| 4 | | | | | |
| 5 | | | | | |
| 6 | | | | | |
| ... | | | | | |
| L | | | | | |

Fingerprint Database

Fig. 10

LOCATION DETERMINATION USING RF FINGERPRINTING

CROSS-REFERENCE TO RELATED APPLICATIONS

This application is a continuation of U.S. patent application Ser. No. 10/128,128, filed 22 Apr. 2002 (to issue on Aug. 24, 2004 as U.S. Pat. No. 6,782,265), which is continuation of U.S. patent application Ser. No. 09/532,418, filed 22 Mar. 2000 (now U.S. Pat. No. 6,393,294), which is a continuation-in-part of U.S. patent application Ser. No. 09/158,296, filed 22 Sep. 1998 (now U.S. Pat. No. 6,269,246). All of these applications are incorporated by reference.

BACKGROUND OF THE INVENTION

The present invention relates generally to telecommunications, and more specifically to wireless communication systems.

In connection with mobile communication systems, it is becoming increasingly important to determine the location of the communicating Mobile Unit (MU). Various systems for locating are already well known. One solution that is readily available in most modern cellular systems is to use the ID of the cell from which the MU is communicating. Typically, this information is accurate to a resolution of several miles. A second solution is to compute the location of the MU based on the cellular network signaling parameters (angle of arrival or time difference of arrival). This information is typically accurate to hundreds of meters. Yet another solution is to equip the MU with a GPS receiver which then attempts to track the location of the MU as accurately as possible. Typically, GPS receivers can compute locations to within several tens of meters of accuracy. When combined with differential corrections, the GPS accuracy can be improved.

As far as reliability is concerned, the cell ID information is the most reliable, and is guaranteed to be available as long as the cellular network is functioning normally. The network signal based location computations are less reliable, since they are dependent on several conditions being true at the time of the call. For example, most schemes require the MU to have line-of-sight visibility to multiple cellular base stations. This is not always possible. GPS based location computation is also not always reliable since the MU may be in an environment where there is no penetration of the GPS satellite signals.

SUMMARY OF THE INVENTION

The present invention provides a method for determining the location of a mobile unit (MU) in a wireless communication system and presenting it to a remote party.

According to one aspect of the invention location of a remote MU is determined by comparing a snapshot of a predefined portion of the radio-frequency (RF) spectrum taken by the MU to a reference database containing multiple snapshots taken at various locations. The result of the comparison is used to determine if the MU is at a specific location. The comparison may be made in the MU, or at some other location situated remotely from the MU. In the latter case, sufficient information regarding the captured fingerprint is transmitted from the MU to the remote location. The database may be pre-compiled or generated on-line.

The invention also provides methods for generating an RF fingerprint database.

A further understanding of the nature and advantages of the present invention may be realized by reference to the remaining portions of the specification and the drawings.

BRIEF DESCRIPTION OF THE DRAWINGS

FIG. 9 is an illustration of the organization of the fingerprint data; and

FIG. 10 is an illustration of the organization of the fingerprint database.

DETAILED DESCRIPTION

The present invention provides a new method for determining the location estimate of a Mobile Unit (MU) in a wireless communication network.

Figure 1:
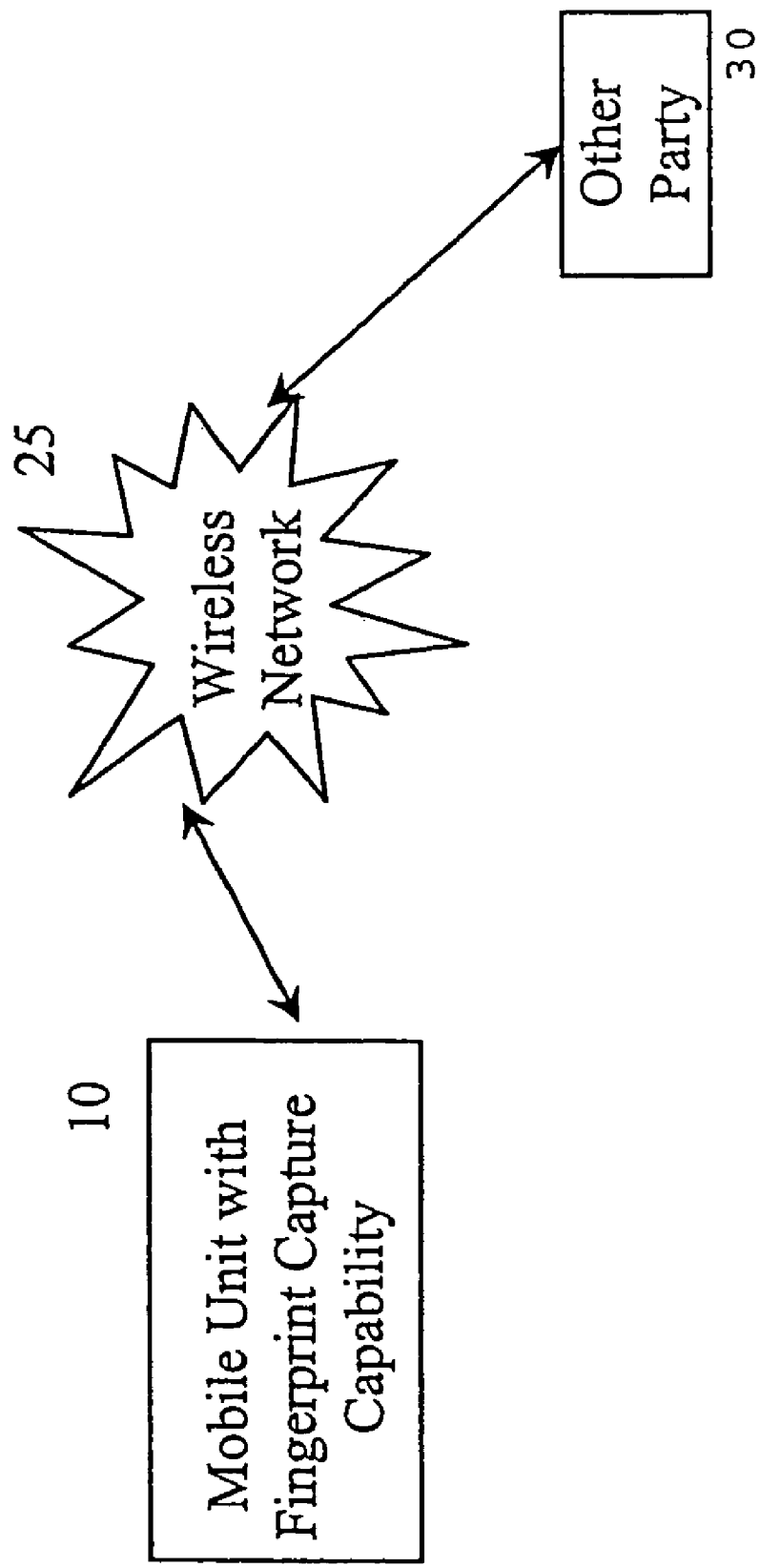
FIG. 1 shows a representative wireless communication system.

FIG. 1 is a high level block diagram of a wireless communication network. A Mobile Unit 10 has a connection with a wireless network 15, which in turn is connected to an Other Party 30. The Other Party may or may not be mobile. The location of the MU is of interest to the Other Party for several reasons such as provisioning of prompt and efficient personalized services, dispatching emergency assistance personnel, tracking the movements of the MU, etc.

There are several different prior art methods for determining the location of MU 10, as is known to one skilled in the art. For example, the MU could be equipped with a GPS receiver. Alternatively, the wireless network could be equipped to determine the location of MU 10. For example, the network could monitor the time of arrival of signals from the MU at various nodes and from that information determine its location. Again, such techniques are well known to one skilled in the art.

All of the prior art techniques have significant disadvantages. For example, it is well known that GPS receivers do not work very well in urban canyons and indoor locations where signal strength is very low. The network based schemes such as TDOA and AOA (both well known prior art) are disadvantaged in that they need significant infrastructure modifications.

The present invention provides a new method for determining the location of MU 10 which (a) works in areas where GPS coverage is not typically available, and (b) does not require any infrastructure modifications. Thus, the present invention complements existing location determining technologies and, when used in conjunction with them, augments their performance.

The invention is based on the principle that any location has a unique Radio Frequency (RF) spectral fingerprint. Spectral fingerprint in this context is defined as a predetermined combination of observable RF spectral parameters. For instance, observed signal strength of a predetermined set of signals in the RF spectrum constitutes a fingerprint. Today, worldwide, practically the entire RF spectrum, up to 2 GHz and above, is being utilized by several different applications. The signal characteristics vary greatly across this spectrum. However, for any given location, it is possible to pre-select a portion of the spectrum and a combination of signal parameters in the pre-selected band that will be unique to that location.

In accordance with the invention MU 10 is equipped with circuitry and software that is capable of capturing information from predetermined portions of the RF spectrum. In one embodiment the predetermined portions of the RF spectrum all fall within or in close proximity to the same band as that utilized by the wireless communication network. In such an instance the same hardware circuitry can be used for performing both functions. In another embodiment the predetermined portions of the RF spectrum are different from the wireless communication band and in such an instance additional circuitry is required. For example, the MU may use signal characteristics from the television UHF band, in which case it will require a television tuner capable of capturing the appropriate television channels. In another example the MU is equipped with a tuner designed to capture AM or FM radio broadcasts. In this case the MU is equipped with a radio capable of tuning to the appropriate radio broadcasting bands.

Figure 2:
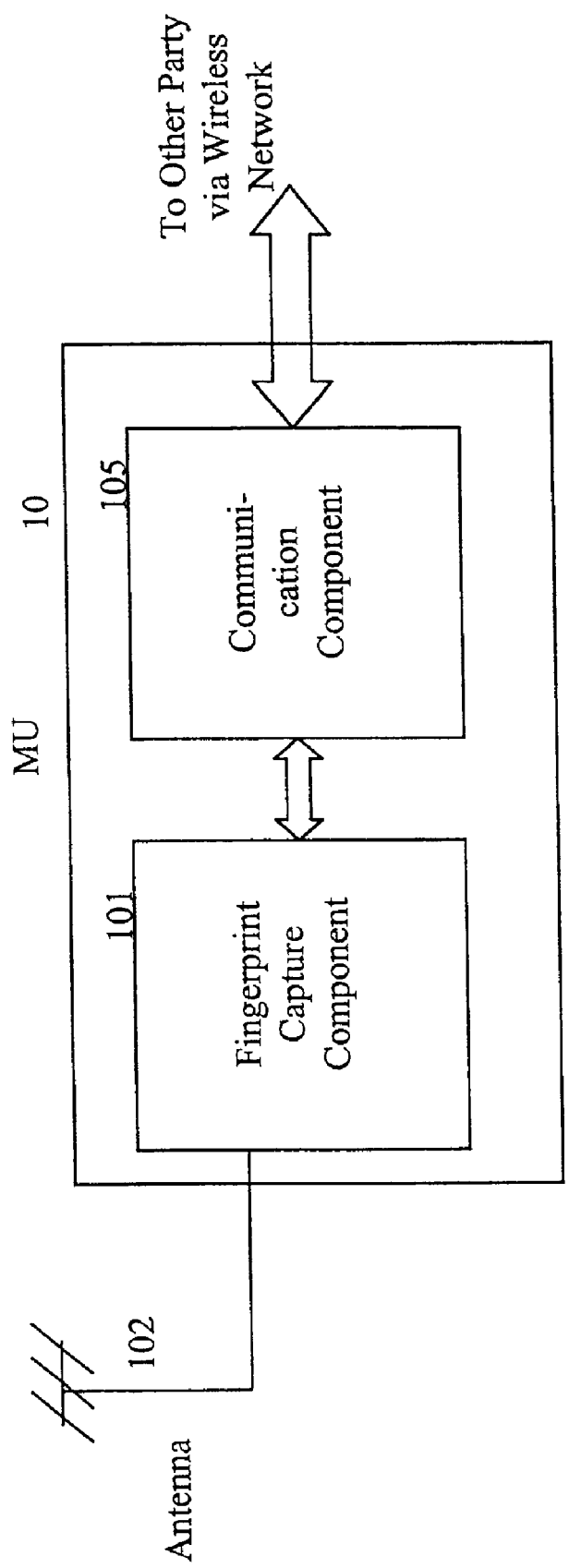
FIG. 2 is a high level diagram of the Mobile Unit.

FIG. 2 shows the MU containing a component 101 for tuning to a predetermined portion of the RF spectrum. Also included is a communication component 105 for communicating information with the Other Party over an existing wireless infrastructure. Component 101 obtains information from the RF spectrum via an Antenna 102. In one embodiment of the system, the communication link between the MU and Other Party is through the base stations and base station controllers of the cellular network. In another embodiment of the system, data is communicated in both directions between the MU and Other Party by using the Short Messaging System (SMS) of the network. Using SMS messages for implementation of this invention has the advantage of avoiding potential interference with voice channel network operations.

In many instances, Other Party 30 is interested in only determining if MU 10 is at a particular location or not. The resolution of knowing the MU's location is not high (e.g., several meters), but much coarser, such as of the order of several tens of meters. For example, Other Party 30 may be interested in knowing if MU 10 is inside a particular building, or a campus or a block. In such cases it is not necessary to provide very high-resolution information to Other Party 30.

There are other instances where Other Party 30 is desirous of knowing the accurate location of MU 10, however, is incapable of doing so. This could be because other location determining capabilities in the system, such as GPS, are not functional at the instant when the location information is desired. This is typical when the MU is in an area where GPS signals are not available, such as inside a building. The location determining method described in this invention is capable of operating in areas where GPS and other location technologies are not.

When a location estimate of the MU is desired (either by itself or by the Other Party), it activates component 101 (FIG. 2), which captures predetermined information from a predetermined portion of the RF spectrum. Instructions regarding what information to capture and the portion of the RF spectrum from which to capture may be either pre-programmed in the MU, or generated in real time. In the latter case, it may be generated in the MU, or downloaded into the MU from the Other Party over the wireless network. The MU may capture multiple pieces of information or from multiple portions of the spectrum.

The spectral fingerprint may be generated using many different parameters, either individually or in combination. In one embodiment, signal strength is used. In another embodiment, phase information is used. In another embodiment, the identity of the received signals (e.g., frequency) is used. In yet another embodiment, the identity of the signal source (e.g., channel number or station code) is used. In yet another embodiment, the geographic locations of the transmitters from which the signals originate are used.

A mobile cellular channel is in general frequency selective, i.e., its properties vary over the bandwidth used. The variation depends on the environment, because of multipath signals arriving at different delays. For a GSM signal with a bandwidth about 250 kHz, the dispersion can be felt in urban and hilly environments. It causes inter-symbol-interference, which results in digital errors unless corrected. The time dispersion is often expressed as the delay spread or the standard deviation of the impulse response. The remedy in a receiver is to have an equalizer, typically a transversal filter with some taps that can be adjusted. This filter will remove the inter-symbol-interference. The filter's tap values depend on the environment and impulse response, and thus in principle add additional information to the RF fingerprint. For future systems which use W-CDMA (wideband code division multiple access), the bandwidth is more than 10 times higher, of the order 4-5 MHz. The resolution power is thus much higher, and the various filter taps contain much more information. In this embodiment of the invention, the spectral characteristics within the used bandwidth (and not just individual center frequencies), as measured by the equalizer filter, will be included in the RF fingerprint.

The MU is equipped with the appropriate circuitry and software to capture the required signals and their parameters. In one embodiment the MU has an antenna that is designed to have a bandwidth spanning a large portion of the VHF and UHF spectrum, e.g., from 70 MHz to 1 GHz. In another embodiment, the MU has an antenna that is designed to capture only a narrowband of the spectrum. Such an antenna may be cheaper to implement and unobtrusive. In one embodiment the MU is equipped with appropriate circuitry to determine the strength of the received signal. In one instance the location of the transmitter is broadcast in the signal and is extracted in the MU.

In one embodiment, the MU is instructed by the Other Party to scan selected portions of the spectrum and capture selected parameters from the received signals. The Other Party determines which portions of the spectrum to scan and what parameters to capture based on other information it has received or generated regarding the MU. For example, in one instance the Other Party knows the approximate location of the MU by receiving identity of the (wireless communication network) cell that the MU is in at that time. By looking up a database the Other Party can determine the geographic location of the cell. The Other Party then determines which signals in the vicinity of said cell are most suitable for generating a fingerprint. For example, certain television signals may have better coverage of the cell than other signals. The Other Party then transmits this information (e.g., television channel numbers) to the MU via the wireless link requesting it to scan only those selected signals.

In another embodiment, the MU determines which portion of the spectrum to scan, and what parameters to use for generating the fingerprint.

After the MU captures the appropriate signals and extracts the parameters, it has the basic information for generating the fingerprint. Some preprocessing may be required to refine the raw data. For example, signal strengths may have to be lower and upper limited to eliminate very weak and very strong signals.

Once the fingerprint is generated, its association with a certain location has to be determined. According to this invention this is done by utilizing a fingerprint database that contains a number of fingerprints along with their corresponding location identities. In one embodiment the database is stored in the MU. The generated fingerprint is compared with the fingerprints in the database and the fingerprint in the database that is closest to the generated fingerprint is selected as the match. The corresponding location in the database is then chosen as the location of the MU. In one embodiment, the search algorithm takes more than one fingerprint from the database that are closest to the generated fingerprint and interpolates the most plausible location for the MU from the locations of the chosen fingerprints.

In another embodiment, the fingerprint database is stored at the Other Party and the generated fingerprint (in the MU) is transmitted to the Other Party over the wireless link. The search for the closest fingerprint is then done in the Other Party from which it determines the location of the MU.

Figure 3:
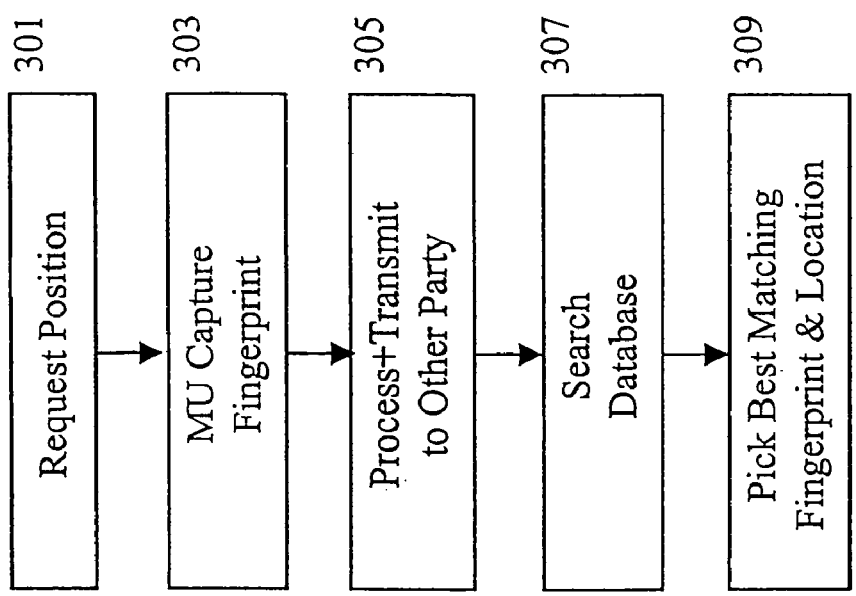
FIG. 3 is a flow diagram of the position determining process employed by this invention.

FIG. 3 depicts the flow of events in this case. A request for position of the MU is generated, as shown in box 301. The request may be generated by the user carrying the MU, or remotely by the Other Party. On receipt of the request the MU captures the fingerprint of its current location (box 303). The captured fingerprint is processed appropriately. Processing may include filtering the fingerprint data and reformatting it to reduce its storage space. Subsequently the fingerprint is transmitted over the wireless link to the Other Party as shown in box 305. The Other Party has a database into which it executes a search for the closest matching fingerprint, as shown in box 307. Box 309 shows the process culminating in the retrieval of the best matching fingerprint along with its corresponding location. In one embodiment the search also returns a confidence measure that depicts the closeness of the match.

According to one implementation, the fingerprint database is designed to compensate for any co-channel and adjacent-channel interference measured by the mobile unit (MU). This channel interference can result from either control channels or traffic channels. To improve the accuracy, as well as viability, of any algorithm for MU location based on measurements of base station signal strengths, corrections for channel interference will be required. These interference corrections are calculated and updated off-line using RF prediction models (the same models employed to generate the original fingerprint database) and the wireless carrier's frequency/channel allocation plan (FCAP). In one embodiment of the invention, the interference corrections are implemented in the fingerprint database, which is stored in the Other Party (i.e., Location Server).

Figure 4:
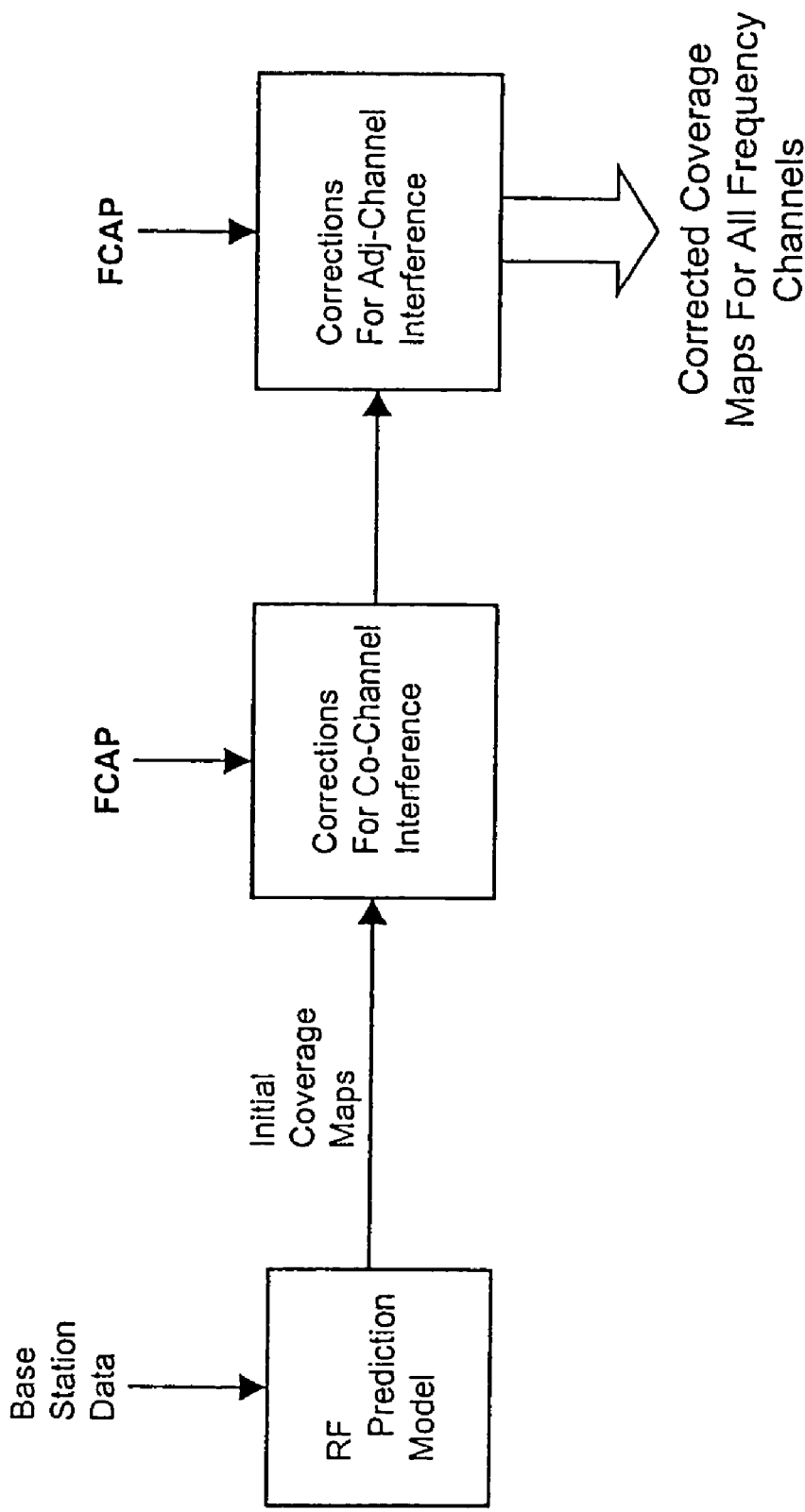
FIG. 4 is a block diagram showing the technique for implementing corrections for co-channel and adjacent-channel interference.

FIG. 4 describes the data flow and processing requirements for this technique. The data required from the wireless carrier's FCAP is as follows: cell global identifiers, frequency identifiers for the assigned base station control channels, and frequency identifiers for the assigned traffic channels. Co-channel interference sources are identified using the FCAP to identify base stations that are assigned the same frequency channel; the corrected signal strengths in each channel are then calculated. Adjacent-channel interference sources are identified using the FCAP to identify base station pairs that are assigned adjacent frequency channels; the corrected signal strengths are then calculated by also using the MU's filter discrimination ratio. The resulting interference-corrected fingerprints are stored in the fingerprint database.

Figure 5:
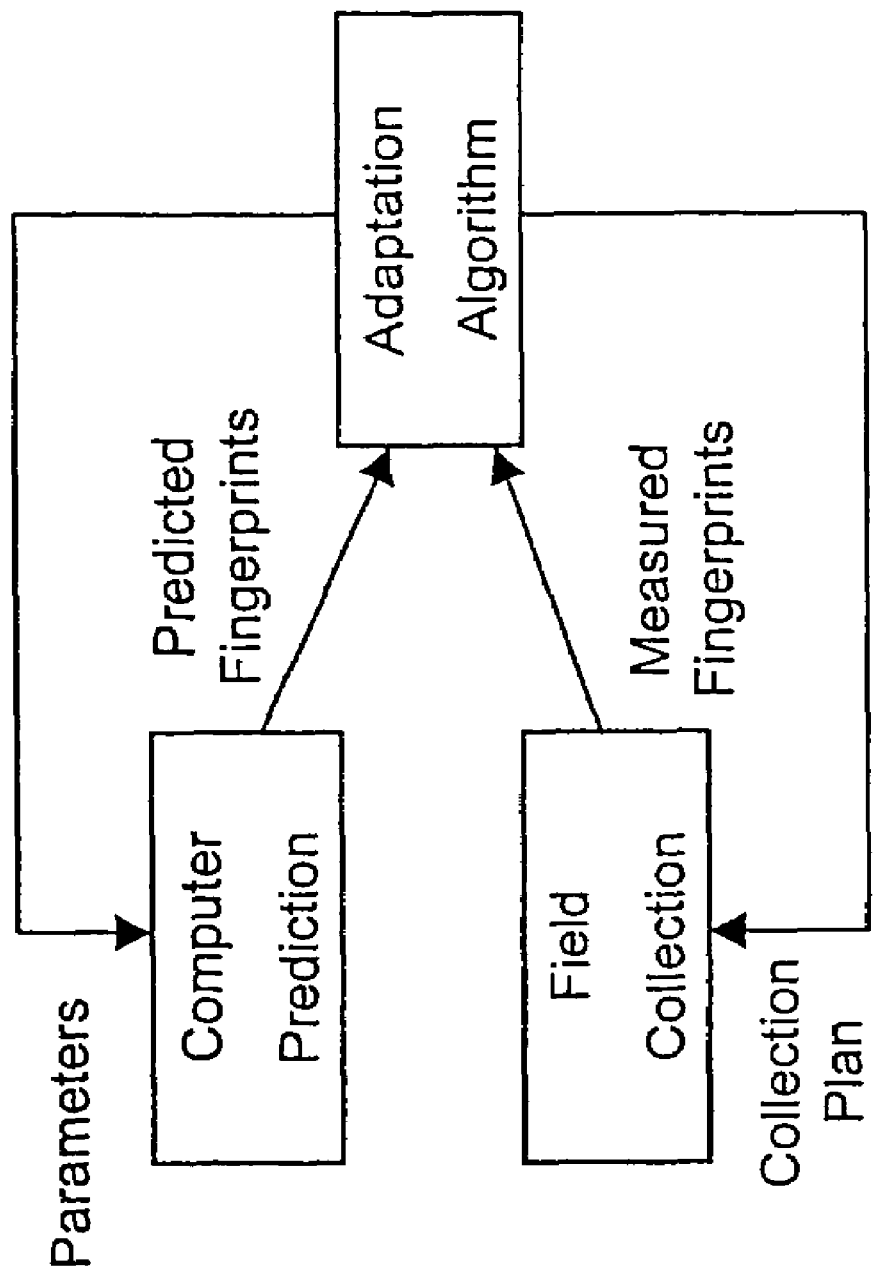
FIG. 5 is a block diagram describing the technique for calibrating the predicted fingerprint database using field measurements.

According to one implementation, the fingerprint database is generated by computer calculations with RF prediction models using certain parameters which depend on the type of buildings, terrain features, time of the day, environmental and seasonal conditions, etc. The calculations are based upon theoretical models which have general applicability, but cannot consider all of the details in the real world. The accuracy of the fingerprint database can be enhanced by comparing the model predictions with field measurements as shown in FIG. 5. The adaptation algorithm analyzes the nature of the difference between the predicted and measured fingerprints and determines the best way of changing the model parameters to reduce the difference. Since the database consists of multiple frequencies, the difference is a multi-dimensional vector. The minimization of the difference can use a combination of advanced computational techniques based upon optimization, statistics, computational intelligence, learning, etc.

The adaptation algorithm also determines what measurements to collect to best calibrate the RF prediction model. Instead of collecting all measurements, only measurements that can provide the maximal information to support reduction of the prediction errors are collected. The specific choice of measurements to collect is based upon an analysis of the nature of the error and the desired accuracy of the prediction model. The algorithm determines not just the locations for measurement collection, but also the time of collection, and the number of measurement samples needed to achieve a certain degree of accuracy based upon statistical considerations.

To improve the accuracy of the fingerprint database, learning/training techniques and methodologies can be adopted for this problem. For this embodiment of the invention, either Support Vector Machines for Regression or Regularized Regression can be used to learn each mapping of position versus fingerprint (measured or predicted signal strengths). Position will be used as the input value, while signal strength will be used as the target value. The complete grid of locations for the cellular service area will be used as training data. The final result is a learned relationship between position and signal strength for each mapping so that, given an arbitrary position, the corresponding signal strength is obtained for each particular frequency channel.

The inputs of the training step are a set of positions matched with the corresponding signal strengths, and the fingerprint measurements whose information should be considered in the learning process are added to the training set. The machine is then re-trained and a new grid is generated for the database, to replace the old one. The following list summarizes the major advantages of learning/training techniques: (1) they offer a way to interpolate between grid points and reconstruct the grid, together with metrics to relate measurements and expected fingerprints; (2) a local improvement of the neighboring area results from adding one measurement to the training set, and not only the particular location is affected, therefore, there is no need to obtain measurements for the complete grid; (3) measurements taken at different times can help to produce specific databases for different times of the day, different weather conditions, or different seasons; and (4) the system can learn which are the ambiguous areas with an intelligent agent, and collect measurements for them, so the database can be continually improved.

According to one implementation, the fingerprint database is designed to take into account any dynamic, but predetermined, variations in the RF signal characteristics. For example, it is not uncommon that some AM radio broadcast stations lower their transmitter power at night to minimize interference with other stations. In some countries this is mandated by law. If signal strength is one of the parameters used for generating the fingerprint, then it is essential that the dynamic change in transmitted power be taken into consideration before any decision is made. According to this aspect of the invention, the fingerprint database and the decision algorithms are designed to accommodate such dynamic changes. Since the change pattern in signal characteristics is predetermined, the database is constructed by capturing the fingerprints at different times so as to cover all the different patterns in the transmitted signals. The time at which a fingerprint was captured is also stored along with its location identity.

There are many choices for the search algorithm that is required to determine the closest matching fingerprint, as can be appreciated by one skilled in the art of statistical pattern matching. Specifically, the choice of the algorithm is a function of what parameters are used to generate the fingerprints. In one instance the search algorithm chooses the fingerprint from the database that has the smallest mathematical distance between itself and the captured fingerprint. The mathematical distance is defined as a norm between the two data sets. For example, it could be the average squared difference between the two fingerprints. There are many different ways to define "closeness" between two fingerprints; again, this is dependent on the signal parameters used to generate the fingerprints. In one embodiment the search algorithm also has built in heuristics that make the best possible decision in case none of the fingerprints in the database matches well with the generated fingerprint.

Mobile unit (MU) location determination that separately processes single time samples of the first fingerprints (i.e., measured fingerprints) will herein be referred to as "static location," which has been shown to be an inherently inaccurate solution. Using a processing approach based on the time series nature of the measured fingerprints, herein referred to as "dynamic location," can yield significant improvements in location accuracy with respect to static location techniques. In this embodiment of the invention, a dynamic location technique, which is based on Markov theory and exploits the time history of the measured fingerprints, is described in FIGS. 6 and 7. The procedure uses a predicted fingerprint model and a time series of fingerprint measurements from the MU to calculate the probability distribution of the MU's location. The probability distribution is then used to compute an estimate of the current location of the MU using one of several statistical methods.

Figure 6:
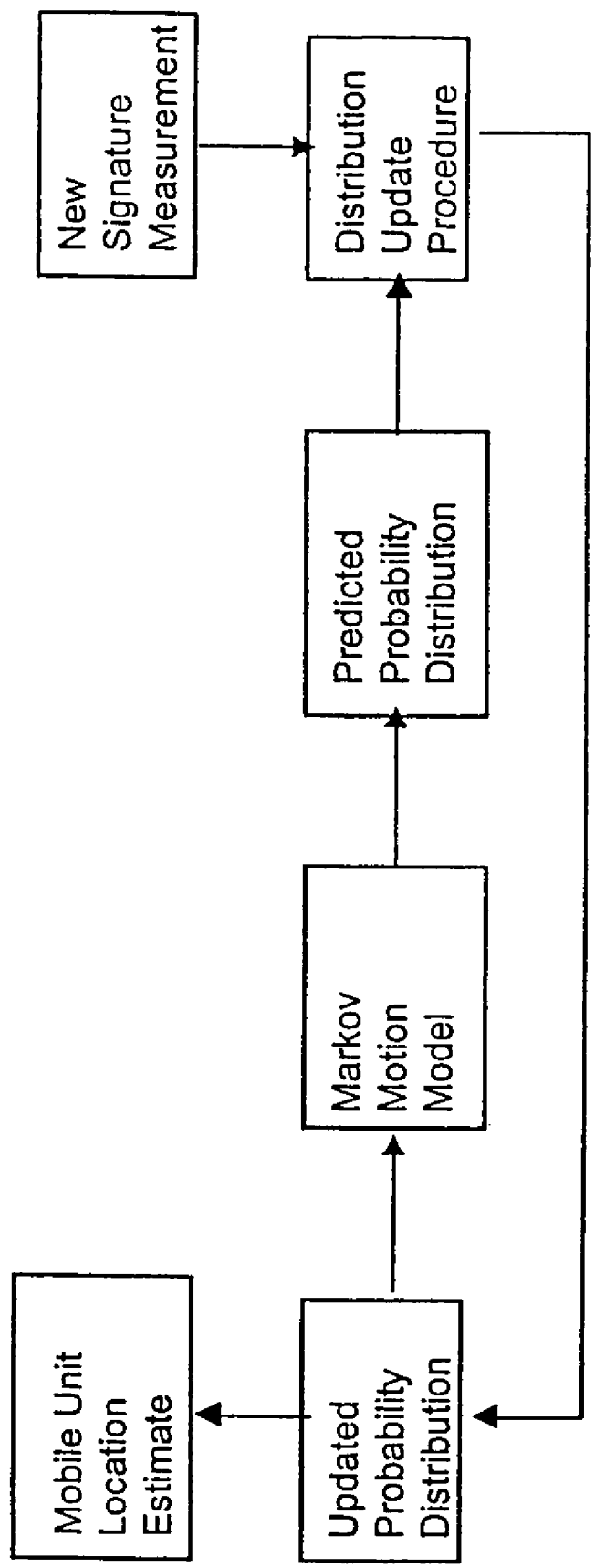
FIG. 6 is a block diagram showing the operation of the recursive processing Markov algorithm.
Figure 7:
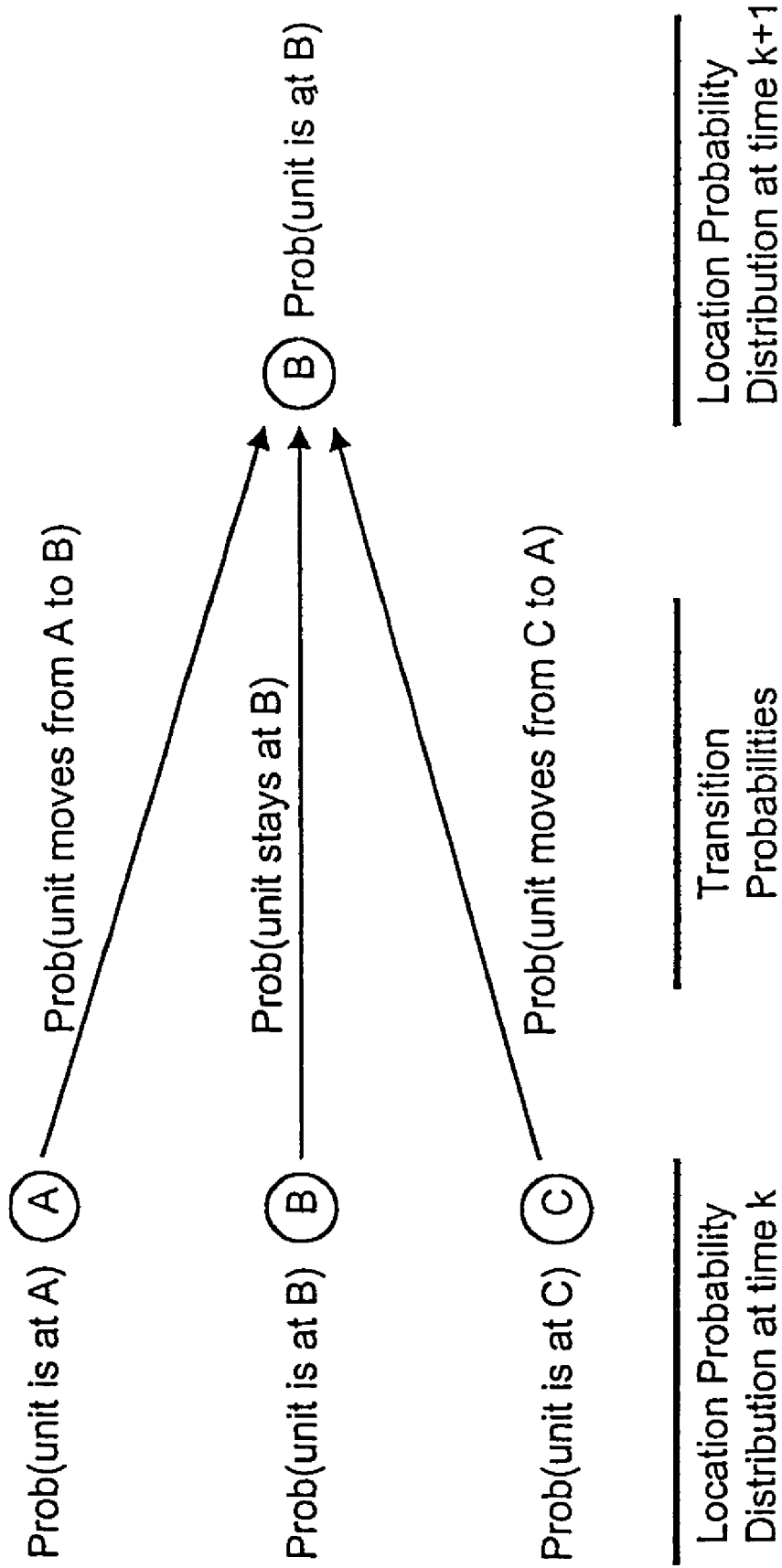
FIG. 7 describes the Markov transition probabilities.

As shown in FIG. 6, the processing algorithm is recursive and uses a predefined array of possible locations. When the algorithm has processed the time series of fingerprint measurements currently available, it will have calculated the probability that the MU is at each point in the array of possible locations (the updated probability distribution). This probability distribution is the basic state of the algorithm that incorporates all of the information that has been collected on the MU up to the current time. When a new fingerprint measurement becomes available, the algorithm uses its knowledge of the possible motions of the MU during the time period between the last measurement and the new measurement to predict a new location probability distribution (the predicted distribution). This prediction algorithm is based on a Markov process model, which uses the probability that the unit is at each location and the probability that it will transition from one location to another to calculate the probability that it will be at each location at the next measurement time (see FIG. 7).

Next, the algorithm uses the predicted signature model and the new signature measurement to calculate a location probability distribution based on the new measurement alone. This probability distribution is then combined with the predicted distribution to produce a new updated distribution that now incorporates the information provided by the new measurement.

Before any measurements are available, the algorithm starts with an initial probability distribution that assumes that the MU is equally likely to be at any location in the cell for the base station handling the call. The location probability distribution (either updated or predicted) may be used to compute an estimate of the MU's location whenever such an estimate is needed. The basic algorithm calculates both the expected location and the most probable location, but other location statistics (as deemed appropriate) could also be calculated from the location probability distribution. The location estimate may be calculated for either the time of the last fingerprint measurement (which yields a filtered estimate) or for some time before the last fingerprint measurement (which yields a smoothed estimate). The smoothed estimate is more accurate than the filtered estimate, because it uses more information (i.e., some number of subsequent measurements). However, the smoothed estimate requires both a larger state and more computation than the filtered estimate.

Matching the measured fingerprints to the fingerprint database may yield multiple location possibilities in the presence of measurement and modeling errors. A single hypothesis approach that selects the best location estimate for the MU using only the current measured fingerprint is likely to produce erroneous results. In this embodiment, a multiple hypothesis testing technique uses measured fingerprints from multiple times, the fingerprint database, and MU motion constraints to generate multiple hypotheses for MU locations over time and then selects the best hypothesis based upon statistical measures.

Figure 8:
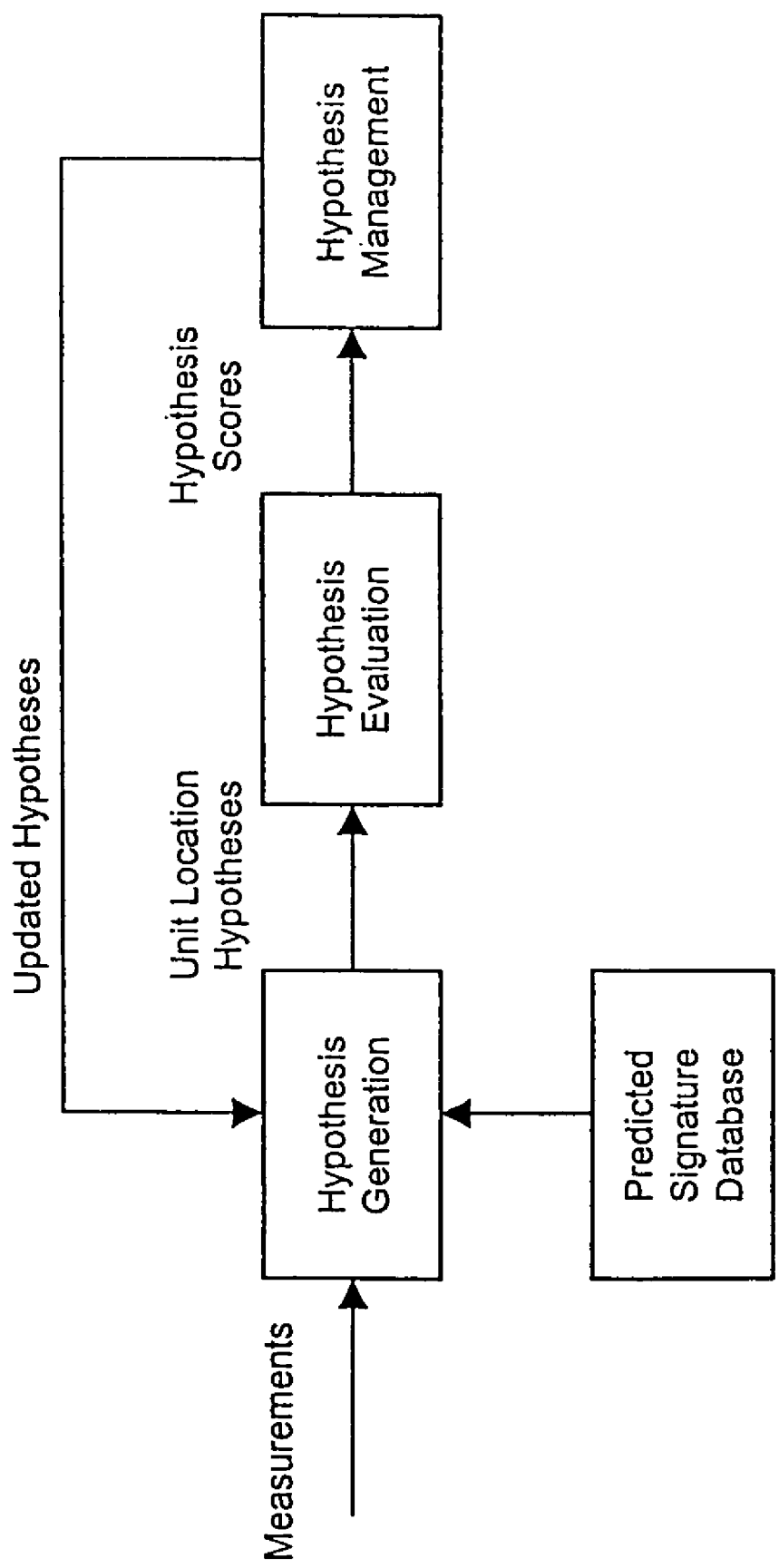
FIG. 8 is a block diagram showing the operation of the multiple hypothesis testing algorithm.

In FIG. 8, the measured fingerprints are compared with the fingerprint database to generate possible MU location hypotheses. When previous location hypotheses are available, these hypotheses are updated with the latest measurements to form new hypotheses. The number of hypotheses is reduced by considering only those locations that are consistent with the previous location hypotheses. A previous location hypothesis may yield multiple new hypotheses because of possible new locations. However, some previous location hypotheses may not have consistent new locations based on the new measurements. A hypothesis evaluation algorithm then assigns a score to each of the updated location hypotheses. This score measures how well the locations at different times in the hypothesis are consistent with reasonable MU motion and measurements characteristics. The evaluation of this score is based upon statistical techniques and uses MU motion constraints, the fingerprint database, and the measured fingerprint characteristics. The score also depends on the score of the previous hypothesis. The location hypotheses are then ranked according to this score. A hypothesis management algorithm reduces the number of hypotheses by removing hypotheses with low scores and combining similar hypotheses. The surviving hypotheses are then updated with new measurements.

The complexity of the search can be greatly reduced if an approximate estimate of the MU's location is already available. For example, if the identity of the cell in which the MU is located is known, then according to this invention, the search algorithm will limit its search to only those fingerprints that correspond to locations contained within said cell.

Similarly, the search complexity is reduced by noting the time at which the location information is requested. As previously mentioned, not all fingerprints in the database are valid for all times in the day. Knowing the time at which the request is received, the database engine limits the search to the appropriate fingerprints.

FIG. 9 illustrates a structure 400 of the fingerprint in one embodiment. As mentioned previously there are several possible methods for defining the fingerprint; FIG. 9 is but an example. The time at which the fingerprint is captured is stored in the fingerprint structure, as shown by box 401. In one embodiment the UTC format is used to store time. There are several fields in the structure, some of which are optionally filled by the MU. Some other fields are optionally filled by the Other Party. It is not necessary that all fields be filled, since the necessary fields can be predetermined based on system parameters.

The fingerprint comprises characteristics of received signals at multiple frequencies. Each column in FIG. 9 is information pertaining to a particular frequency or carrier. A Station ID field 403 indicates the unique identifying code of a broadcasting station from which the signal emanated. This field is optional. In one embodiment this field is filled by the MU using information received in the signal. In another embodiment this field is filled by the Other Party to indicate to the MU as to which signals to capture for the fingerprint. A Frequency field 405 is the unique frequency value at which a signal is captured. Either the Station ID field or the Frequency field is mandatory since without both it is not possible to identify the signal. A Tuning Parameter field 407 is used when the MU requires additional information to tune to a particular carrier. In one embodiment this field is supplied by the Other Party with information containing the modulation characteristics of the signal. This field is optional. In one embodiment a Transmitter Location field 409 is used to characterize the received signals. In another embodiment this field is filled by the Other Party. The MU may optionally use this information to determine if it wants to capture the signal emanating from a particular transmitter. Finally, Signal Strength fields 411, 413, are filled by the MU based on the signal strengths of the received carriers. In one embodiment the signal strength is sampled multiple times for each frequency in order to smooth out any variations. At least one of the Signal Strength fields is required to be filled by the MU.

FIG. 10 shows the high level structure of the fingerprint database 501 in one embodiment. As one skilled in the art can appreciate, there are many methods for building, managing and searching databases. The purpose of FIG. 10 is merely to illustrate the structure of the database in one embodiment. Each row in database 501 corresponds to one fingerprint. The Lat and Long fields indicate the latitude and longitude of the location to which the fingerprint corresponds. In one instance the fingerprint corresponds not to one exact spot on the surface of the earth, but instead to a small area. The Lat and Long fields in this embodiment indicate a position inside the area, preferably the center point. The Time column indicates the time at which the fingerprint was captured. In one embodiment the UTC time format is used to indicate this time. The Fingerprint column contains the actual fingerprint data. In one embodiment the structure depicted in FIG. 9 is used to store the fingerprint data. Finally, the Description column contains a short description of the location corresponding to the fingerprint. For example, it may indicate a street address, or an intersection. This field is optional.

In one embodiment, the database is built by taking off-line snapshots of fingerprints at various locations. The fingerprint information along with the coordinates of the location are entered into the database. The more the locations, the richer the database. The resolution of location determination is also controlled by how far apart the fingerprint samples are taken. The closer they are, the higher the resolution. Of course, a person skilled in the art can appreciate that the resolution of the database is limited by the sensitivity of the fingerprint measuring device. In one embodiment the fingerprints are taken using very sensitive signal measuring devices that enable locations that are very close to each other to have distinct fingerprints.

In another embodiment, the database is built by taking fingerprint measurements at predetermined locations and using intelligent algorithms that interpolate the fingerprints at all locations in between the sampled locations. This method has the advantage of not requiring a great many physical measurements to be made, however, it does suffer from some loss in accuracy. This is because, however clever, the interpolating algorithms will not be as accurate as making the actual measurements.

In yet another embodiment, the database is generated on-line using smart algorithms that can predict the fingerprints in a local area. This scheme is effective in instances where an approximate idea of the MU location is already available. For example, this could be the cell in which the MU is located.

Location estimation procedures using a predicted fingerprint model and fingerprint measurements from the MU are subject to several sources of error, including errors in measuring the fingerprints and mismatches between the fingerprint model and the real world. If the predicted fingerprints in two locations are similar, either of these error sources may cause the measured fingerprint to more closely match the fingerprint model for the incorrect location than for the correct location. This situation leads to the possibility of fingerprint ambiguities.

For this embodiment of the invention, when a fingerprint model is produced for a particular region, it can be subjected to statistical analysis to assess both the location accuracy that may be expected in that region and to identify specific areas that can have potential ambiguity problems. For each point in the fingerprint model, the probability distribution of ambiguous locations may be calculated, as a function of the level of errors expected, by computing the likelihood that each pair of location points will be confused at that error level. The characteristics of this distribution provide information about the accuracy and confidence of location estimates. If the distribution at a particular point is tight (low statistical variance), location estimates of MU's at that location should be quite accurate. If the distribution at a particular point is very broad (high statistical variance), location estimates of MU's at that location are likely to be inaccurate. Conversely, if the calculated location estimate is at a point known to have high ambiguity (high statistical variance), the confidence attributed to that estimate should be low.

The following references are incorporated by reference in their entirety for all purposes:

T. Suzuki, et al., The Moving-body Position Detection Method; Patent Application (Showa 63-195800), August 1988.

M. Hellebrandt, et al., Estimating Position and Velocity of Mobiles in a Cellular Radio Network, IEEE Trans. On Vehicular Technology, Vol. 46, No. 1, pp. 65-71, February 1997.

I. Gaspard, et al., Position Assignment in Digital Cellular Mobile Radio Networks (e.g. GSM) Derived from Measurements at the Protocol Interface, IEEE Journal, pp. 592-596, March 1997.

J. Jimenez, et al., Mobile Location Using Coverage Information: Theoretical Analysis and Results, COST 259 TD(98), April 1999.

CONCLUSION

In conclusion, it can be seen that this invention has one or more of the following significant improvements over prior art for MU location techniques: (1) it can be implemented without requiring any modifications to the existing wireless network infrastructure, (2) only minor software changes in the MU (typically a cellular phone) are required, and (3) it can be utilized in areas where GPS coverage is either not available or not reliable. This follows because the fingerprints are generated by using portions of the RF spectrum that typically have superior coverage and in-building penetration than GPS signals.

While the above is a complete description of specific embodiments of the invention, various modifications, alternative constructions, and equivalents may be used. Therefore, the above description should not be taken as limiting the scope of the invention as defined by the claims.

What is claimed is:

1. A method comprising:
  capturing, at a mobile unit:
   (i) a first snapshot of a first signal at a first time, wherein the first signal is received by the mobile unit, and
   (ii) a second snapshot of a second signal at a second time, wherein the second signal is received by the mobile unit;
  generating, at a location server:
   (i) a first result based on a comparison of the first snapshot with the contents of a database of RF fingerprints that associates RF fingerprints with locations, and
   (ii) a second result based on a comparison of the second snapshot with the contents of the database of RF fingerprints;
  estimating, at the location server, a location of the mobile unit based on:
   (i) the first result,
   (ii) the second result,
   (iii) the amount of time between the first time and the second time, and
   (iv) a model of the probable motion of the mobile unit between the first time and the second time.

2. The method of claim 1 wherein estimating the location of the mobile unit is also based on whether the first time occurs before the second time.

3. The method of claim 1 wherein the first signal and the second signal are received by the mobile unit through the same antenna at different times.

4. A method comprising:
  receiving, at a location server:
   (i) a first snapshot of a first signal, wherein the first signal was received by a mobile unit at a first time, and
   (ii) a second snapshot of a second signal, wherein the second signal was received by the mobile unit at a second time;
  generating, at the location server:
   (i) a first result based on a comparison of the first snapshot with the contents of a database of RF fingerprints that associates RF fingerprints with locations, and
   (ii) a second result based on a comparison of the second snapshot with the contents of the database of RF fingerprints; and
  estimating, at the location server, a location of the mobile unit based on:
   (i) the first result,
   (ii) the second result,
   (iii) the amount of time between the first time and the second time, and
   (iv) a model of the probable motion of the mobile unit between the first time and the second time.

5. The method of claim 4 wherein estimating the location of the mobile unit is also based on whether the first time occurs before the second time.

6. The method of claim 4 wherein the first signal and the second signal are received by the mobile unit through the same antenna at different times.

7. The method of claim 4 wherein the location server comprises at least one interconnected data processing systems.

* * * * *